(12) United States Patent
Barrese et al.

(10) Patent No.: US 7,378,139 B2
(45) Date of Patent: May 27, 2008

(54) USE OF AMINOSILANE AS AN ADHESION PROMOTER BETWEEN A SILCONE LAYER AND A FLUOROPOLYMER LAYER

(75) Inventors: Elizabeth L. Barrese, Rochester, NY (US); Patrick J. Finn, Webster, NY (US); Alan R. Kuntz, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 413 days.

(21) Appl. No.: 11/208,785

(22) Filed: Aug. 23, 2005

(65) Prior Publication Data

US 2007/0054077 A1    Mar. 8, 2007

(51) Int. Cl.
*B05B 1/36* (2006.01)
*B32B 1/08* (2006.01)
*B32B 25/08* (2006.01)
*B32B 25/20* (2006.01)
*B32B 27/34* (2006.01)
*G03G 15/20* (2006.01)

(52) U.S. Cl. .................. 428/36.91; 428/421; 428/447; 428/448; 428/473.5; 428/474.4; 428/906; 399/333; 427/412.1; 492/53

(58) Field of Classification Search ................ 399/333; 492/53; 427/387, 412.1; 428/36.91, 336, 428/421, 447, 448, 473.5, 474.4, 906
See application file for complete search history.

(56) References Cited

U.S. PATENT DOCUMENTS

| 5,217,837 A | * | 6/1993 | Henry et al. ........... 430/124.33 |
| 5,319,427 A | | 6/1994 | Sakurai et al. |
| 5,547,759 A | | 8/1996 | Chen et al. |
| 5,720,703 A | | 2/1998 | Chen et al. |
| 5,998,034 A | | 12/1999 | Marvil et al. |
| 2003/0207078 A1 | * | 11/2003 | Finn et al. .................. 428/124 |

* cited by examiner

*Primary Examiner*—Ramsey Zacharia
(74) *Attorney, Agent, or Firm*—Oliff & Berridge, PLC

(57) ABSTRACT

A layered structure, which may be used as a fuser member, comprises a first layer containing silicone; a second layer containing a fluoropolymer; and between the first and second layers, an adhesive layer comprising an aminosilane adhesive. In the layered structure, the second layer may additionally contain at least one of a polyamide-imide or a polyamide. Alternatively, or in addition, the adhesive layer may additionally contain fluoropolymer and at least one of a polyamide-imide or a polyamide.

12 Claims, 3 Drawing Sheets

USE OF AMINOSILANE AS AN ADHESION PROMOTER BETWEEN A SILCONE LAYER AND A FLUOROPOLYMER LAYER

BACKGROUND

The disclosure relates to a layered structure that may be used as a fusing member for use in photocopying and other printing.

The electrostatographic process, and particularly the xerographic process, is well known. This process involves the formation of an electrostatic latent image on a photoreceptor, followed by development of the image with a developer, and subsequent transfer of the image to a suitable substrate. In xerography, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. The radiation selectively dissipates the charge on the illuminated areas of the photoconductive insulating layer while leaving behind an electrostatic latent image on the non-illuminated areas. This electrostatic latent image may then be developed to form a visible image by depositing finely divided electroscopic marking particles on the surface of the photoconductive insulating layer. The resulting visible image may then be transferred from the imaging member directly or indirectly (such as by a transfer or other member) to a recording medium, such as transparency or paper. The imaging process may be repeated many times with reusable imaging members.

After the image is transferred from the imaging member to a recording medium, it may be fused to the recording medium using a fusing member. The use of a fusing member constructed with a non-stick material as a top layer and a heat resistant base layer has been known in the electrostatographic art. Typical non-stick materials that have been used include polytetrafluoroethylene (PTFE), fluorinated ethylene propylene (FEP), perfluoroalkoxy (PFA), polychlorotrifluoroethylene (ECTFE), ethylene-chlorotrifluoroethylene (ECTFE), ethylene-tetrafluoroethylene (ETFE), polyvinylidene fluoride (PVDF) and polyvinyl fluoride (PVF), and blends of these materials.

Fluoropolymer resin by itself, though an excellent non-stick material, is not compliant. Silicone compounds, on the other hand, are compliant. It is known in the art form a fuser member having a material combining the non-stick properties of fluoropolymer resins and the compliant properties of silicone elastomers.

U.S. Pat. No. 5,319,427 to Sakurai et al. discloses an image fixing rotatable member including a base member; a silicone rubber layer on the base member; a primer layer on the silicone rubber layer; and a fluorine resin layer on the primer layer, wherein the primer layer is binder material containing the fluorine resin and aminosilane compound. Sakurai discloses that the fluorine resin is included in the primer layer in an amount greater than the silane compound.

U.S. Pat. No. 5,720,703 to Chen et al. discloses a fuser member having: a rigid metal core; a base cushion layer covering the metal core, wherein the base cushion comprises a condensation cured polydimethylsiloxane or an addition cured silicone rubber; a cured fluoroelastomer layer covering the base cushion; an aminosilane adhesive covering the fluoroelastomer layer; and an amorphous fluoropolymer covering the aminosilane adhesive layer.

U.S. Pat. No. 5,998,034 to Marvil et al. discloses a fuser member having a fluoropolymer non-stick topcoat on a compliant silicone rubber baselayer bonded to a metallic insert. The fluoropolymer is adhered to the silicone rubber baselayer using a primer blend of a silane and a polyamide resin. As the silane, this patent discloses vinyltrimethoxysilane, gamma-methacryloxypropyltrimethoxysilane and 3-glycidoxypropyltrimethoxysilane.

U.S. Pat. No. 5,547,759 to Chen et al. discloses a method for making a coated fuser member in which the release coating comprises an outermost layer of fluoropolymer resin bonded to a fluoroelastomer layer by means of a fluoropolymer-containing polyamide-imide primer layer.

Additional and better ways to adhere a fluoropolymer layer to a silicone layer are desired.

SUMMARY

In embodiments, the present disclosure is directed to a method for adhering a fluoropolymer layer to a silicone layer. In embodiments, the method comprises applying an aminosilane adhesive to the silicone layer and forming a fluoropolymer layer containing fluoropolymer and at least one of polyamide-imide or polyamide over the aminosilane adhesive. In embodiments, at least one additional fluoropolymer layer is formed over the fluoropolymer layer containing fluoropolymer and at least one of polyamide-imide or polyamide. The additional fluoropolymer layers may or may not contain a polyamide-imide and/or a polyamide. In preferred embodiments, at least the outer fluoropolymer layer does not contain a polyamide-imide and/or a polyamide. In embodiments, none of the additional fluoropolymer layers contain a polyamide-imide and/or a polyamide.

In embodiments, the present disclosure is directed to a layered structure that may be formed by this method. In embodiments, the present disclosure describes a layered structure comprising a silicone layer; a fluoropolymer layer containing fluoropolymer and at least one of polyamide-imide or polyamide; and, between the silicone layer and the fluoropolymer layer containing fluoropolymer and at least one of polyamide-imide or polyamide, an aminosilane adhesive layer. In embodiments, the layered structure contains at least one additional fluoropolymer layer over the fluoropolymer layer containing fluoropolymer and at least one of polyamide-imide or polyamide. In preferred embodiments, at least the outer fluoropolymer layer does not contain a polyamide-imide and/or a polyamide. In embodiments, none of the additional fluoropolymer layers contain a polyamide-imide and/or a polyamide.

In embodiments, the silicone layer consists of silicone. Alternatively, the silicone layer may contain components other than silicone. In embodiments, the silicone layer contains from about 60 volume % to 100 volume % silicone, preferably from about 65 to about 90 volume % silicone, more preferably from about 70 to about 80 volume % silicone.

Fluoropolymers that may be used in the present invention include, but are not limited to, polytetrafluoroethylene, polymers of chlorotrifluoroethylene, fluorinated ethylene-propylene polymers, polyvinylidene fluoride and hexafluoropropylene. The one of more additional fluoropolymer layers may consist of fluoropolymer. Alternatively, these fluoropolymer layers may contain components other than fluoropolymers. In embodiments, these fluoropolymers layer contains at least 70 weight percent fluoropolymers, preferably at least 80 weight percent fluoropolymers, more preferably at least 90 weight percent fluoropolymers, and most preferably at least 95 weight percent fluoropolymers.

The fluoropolymer layer containing fluoropolymer and at least one of polyamide-imide or polyamide preferably contains from about 10 to about 90 weight percent fluoropolymer and from about 10 to about 90 weight percent polyamide-imide and/or polyamide, more preferably from about 20 to about 80 weight percent fluoropolymer and from about 20 to about 80 weight percent polyamide-imide and/or polyamide. In a preferred embodiment, this layer includes a fluoropolymer and a polyamide-imide.

The aminosilane adhesive layer may consist of aminosilane compounds. Alternatively, the aminosilane adhesive layer may contain components other than aminosilane compounds. In embodiments, the aminosilane adhesive layer contains at least 70 weight percent aminosilane compounds, preferably at least 80 weight percent aminosilane compounds, more preferably at least 90 weight percent aminosilane compounds, and most preferably at least 95 weight percent aminosilane compounds.

In a particularly preferred embodiment, the aminosilane is N-(2-aminoethyl)-3-aminopropyltrimethoxysilane, which has the following formula:

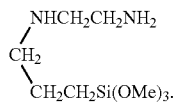

This aminosilane is sold under the designation A0700 by United Chemical Technologies.

In embodiments, the layered structure is a roller. In embodiments, the layered structure is a fuser member. In further embodiments, the present disclosure is directed to an xerographic device comprising a fuser member having the layered structure described herein.

It was found that an aminosilane adhesive could effectively be used to adhere a silicone layer to a fluoropolymer layer containing fluoropolymer and at least one of polyamide-imide or polyamide where the aminosilane adhesive layer has a thickness of less than 5 μm, such as from 1-2 μm. The aminosilane layer can, in fact, be a monomolecular thickness. Having such a thin adhesive layer is advantageous because there may be overall constraints on total thickness of the coating layers. Thus, by having a thinner adhesive layer, additional thickness may be included in another layer. In particular, additional thickness can be included in an outer layer, providing additional wear thickness. As a result, the life of the member may be increased.

Particularly where the fluoropolymer layer containing fluoropolymer and at least one of polyamide-imide or polyamide is a base layer on which at least one additional fluoropolymer layer is formed, it may also be desired that the fluoropolymer layer containing fluoropolymer and at least one of polyamide-imide or polyamide be relatively thin. In embodiments, the fluoropolymer layer containing fluoropolymer and at least one of polyamide-imide or polyamide can have a thickness of less than about 5 μm. In particular, this layer can have a thickness of approximately less than 2 μm or up to 3-4 μm. However, thicker layers may also be used.

In other embodiments, an aminosilane adhesive is included in the fluoropolymer layer containing fluoropolymer and at least one of polyamide-imide or polyamide. In this embodiment, the method comprises applying an adhesive layer to the silicone layer, the adhesive comprising aminosilane adhesive, fluoropolymer and at least one of polyamide-imide or polyamide. The method then comprises forming a fluoropolymer layer over the adhesive layer. This fluoropolymer layer may or may not contain a polyamide-imide and/or a polyamide. In embodiments, at least one additional fluoropolymer layer is formed over this fluoropolymer layer. In preferred embodiments, at least the outer fluoropolymer layer does not contain a polyamide-imide and/or a polyamide. In embodiments, the adhesive layer contains at least 50% by weight, preferably at least 70% by weight, aminosilane compounds.

In embodiments, the present disclosure is directed to a layered structure that may be formed by this method. In embodiments, the present disclosure describes a layered structure comprising a silicone layer; a fluoropolymer layer; and, between the silicone layer and the fluoropolymer layer, an adhesive layer containing aminosilane adhesive, fluoropolymer and at least one of polyamide-imide or polyamide. In embodiments, the adhesive layer contains at least 50% by weight, preferably at least 70% by weight, aminosilane compounds. The fluoropolymer layer may or may not contain a polyamide-imide and/or a polyamide.

BRIEF DESCRIPTION OF THE DRAWINGS

Various exemplary embodiments of the disclosure will be described in detail, with reference to the following figures, wherein.

DETAILED DESCRIPTION OF EMBODIMENTS

In conjunction with the accompanying drawings, an exemplary fuser member, particularly a fuser roller, according to the present disclosure, an exemplary image fusing apparatus comprising the fuser roller, and an exemplary xerographic device containing the image fusing apparatus will be described in detail. However, the present disclosure also includes fuser members that are not a roller, such as fuser belts, as well as other layered structures comprising a silicone layer, an aminosilane adhesive layer and a fluoropolymer layer.

Figure 1:
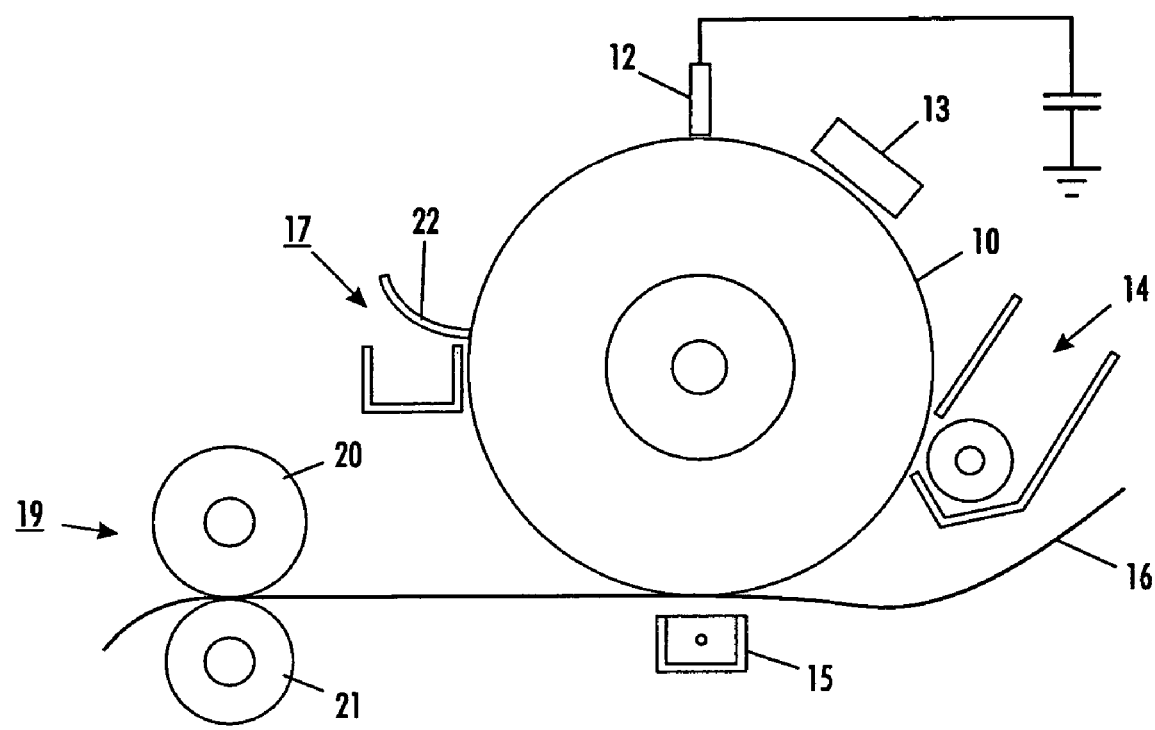
FIG. 1 is a sectional view of an image fixing apparatus.

Referring to FIG. 1, in a typical xerographic device, a light image of an original to be copied is recorded in the form of an electrostatic latent image on a photosensitive member, and the latent image is subsequently rendered visible by the application of thermoplastic resin particles, commonly referred to as toner. Specifically, photoreceptor 10 is charged on its surface by means of a charger 12 to which a voltage has been supplied from a power supply. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface in image configuration, they are transferred to copy sheet 16 by transfer means 15, which can be pressure transfer, electrostatic transfer, or the like. Alternatively, the developed image can be transferred to an intermediate transfer member and subsequently transferred to a copy sheet. Transfer of the developed image from the imaging member to the intermediate transfer element and transfer of the image from the intermediate transfer element to the substrate can be by any suitable technique conventionally used in electrophotography, such as corona transfer, pressure transfer, bias transfer, and combinations of those transfer means, and the like.

After transfer of the developed image to the image receiving substrate, copy sheet 16 advances to fusing station 19, depicted in FIG. 1 as fusing and pressure members (rolls), wherein the developed image is fused to copy sheet 16 by passing copy sheet 16 between fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
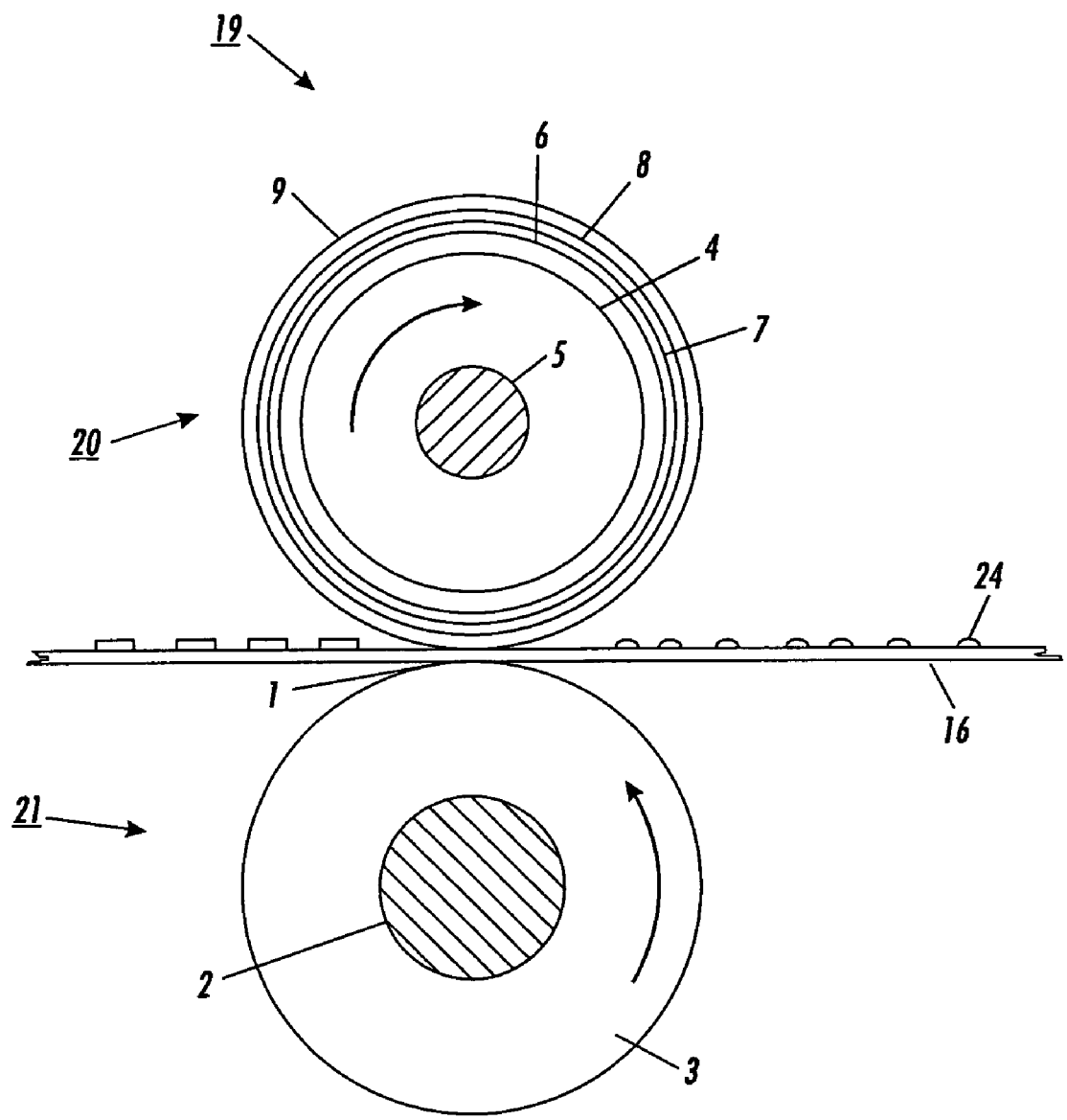
FIG. 2 is an enlarged view of a fuser roller according to an embodiment of the present disclosure.

Referring to FIG. 2, an embodiment of a fusing station 19 is depicted with an embodiment of a fuser roll 20 having a layered structure according to an embodiment of the present disclosure on a suitable base member or substrate 4, which may have a suitable heating element 5 disposed in a hollow portion thereof which is coextensive with the cylinder. The layered structure includes a silicone layer 6, an aminosilane adhesive layer 7, a fluoropolymer layer 8 containing fluoropolymer and polyamide-imide and/or polyamide, and a fluoropolymer layer 9, which need not and preferably does not contain polyamide-imide or polyamide. The fuser member 20 optionally includes an adhesive layer adhering the silicone layer to the substrate and/or one or more additional fluoropolymer layers between fluoropolymer layers 8 and 9.

Backup or pressure roll 21 cooperates with fuser roll 20 to form a nip or contact arc 1 through which a copy paper or other substrate 16 passes such that toner images 24 thereon contact the surface of fuser roll 20. As shown in FIG. 2, an embodiment of a backup roll or pressure roll 21 is depicted as having a rigid steel core 2 with a polymer or elastomer surface layer 3 thereon. The pressure member 21 can also optionally include a heating element (not shown).

Figure 3:
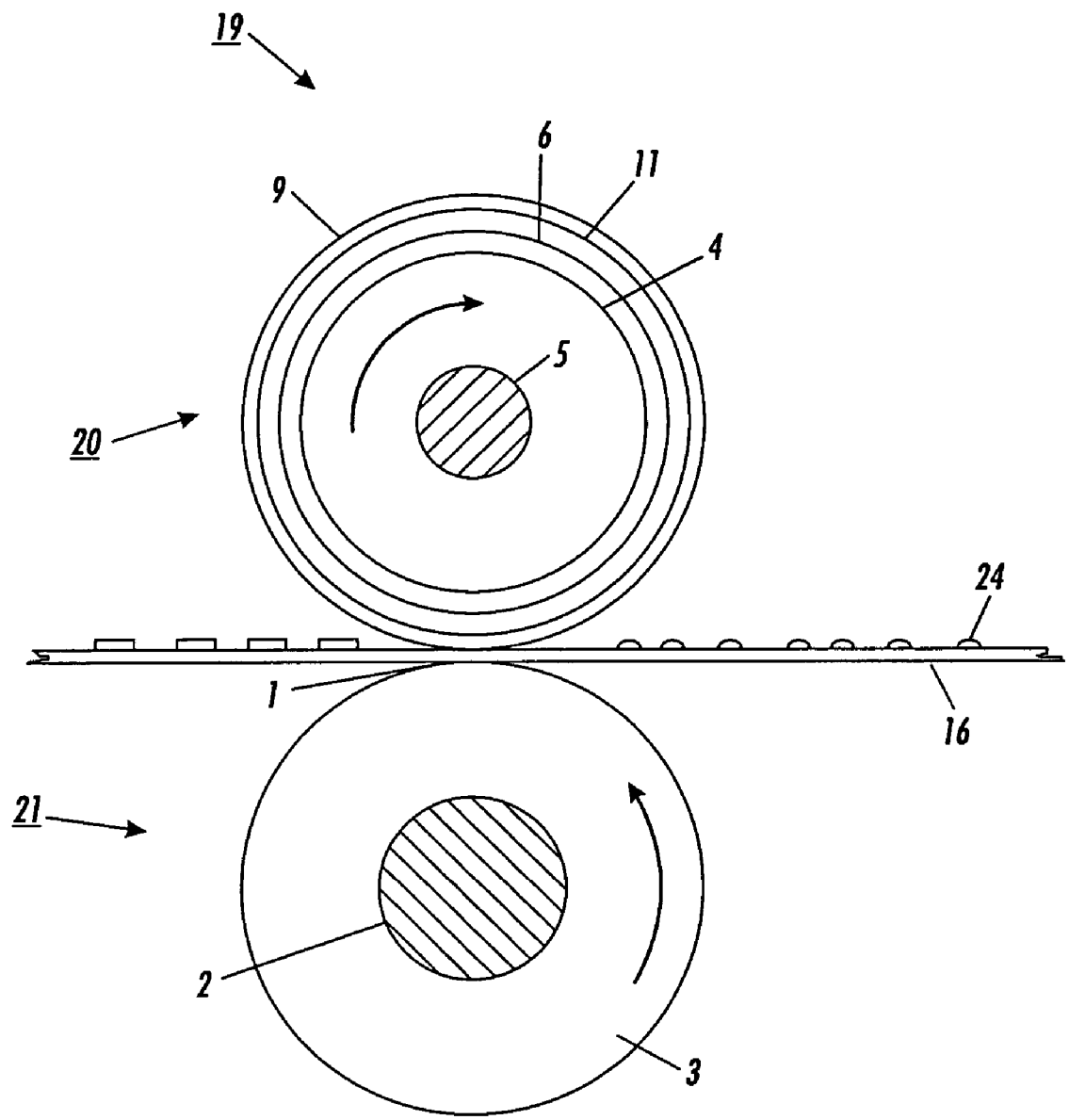
FIG. 3 is an enlarged view of a fuser roller according to another embodiment of the present disclosure.

Referring to FIG. 3, an embodiment of a fusing station 19 is depicted with an embodiment of a fuser roll 20 having a layered structure according to an embodiment of the present disclosure on a suitable base member or substrate 4, which may have a suitable heating element 5 disposed in a hollow portion thereof which is coextensive with the cylinder. The layered structure includes a silicone layer 6, an adhesive layer 11 containing an aminosilane adhesive, fluoropolymer and polyamide-imide and/or polyamide, and a fluoropolymer layer 9, which need not and preferably does not contain polyamide-imide or polyamide. The fuser member 20 optionally includes an adhesive layer adhering the silicone layer to the substrate and/or one or more additional fluoropolymer layers between layers 11 and 9.

A fuser roll according to the present disclosure may be fabricated by techniques known in the art. Techniques for forming a fuser roll are described in U.S. Pat. No. 5,319,427 to Sakurai et al., U.S. Pat. No. 5,720,703 to Chen et al. and U.S. Pat. No. 5,998,034 to Marvil et al., each of which are herein incorporated by reference in their entirety.

In embodiments, the fuser roll is fabricated by liquid injection molding a silicone compound onto a metal or plastic insert, preferably an aluminum insert. Prior to the molding process, the metal insert may be prepared by first cleaning the surface by degreasing and then a silicone rubber primer is applied by spraying. Typical silicone rubber primers for adhering to a metallic substrate are vinyltrimethoxysilane, gamma-methacryloxypropyltrimethoxy silane, vinyltris (T-butylperoxy) silane and partially hydrolyzed silane materials.

The injection molding process maybe carried out using a two cavity mold connected to a liquid injection machine. The silicone layer may be cured in the mold. Depending on the material and thickness, post curing can also be conducted in an oven.

The post cured silicone layer of each roll may then be ground to the desired finished diameter and roughness. The thickness of the silicone coating applied can range anywhere from about 0.05 to 10.00 mm, and preferably between 0.2 to 7 mm, most preferably about 0.22 mm. The surface finish of the ground silicone is preferably no rougher than about 40 Ra. The ground sample may then be subjected to another cleaning process to remove any dust particles on the surface followed by an aqueous washing operation.

The cleaned roll may then be sprayed with the adhesive. To spray the adhesive, it may be diluted in a solvent, such as dry alcohol. In embodiments, aminosilane adhesive is diluted in a solvent to an amount of less than 1% to approximately 50% by weight aminosilane adhesive. Preferably, the aminosilane adhesive is diluted to an amount of 2% to 15% by weight, more preferably from 3% to about 8% by weight, and most preferably about 5% by weight aminosilane adhesive. Aminosilane adhesives that may be used include, but are not limited to, N-(2-aminoethyl)-3-aminopropyl trimethoxysilane, 3-aminopropyl triethoxysilane, 3-aminopropyl triethoxysilane and 3-aminopropyl methyldiethoxysilane.

In embodiments of the disclosure, the adhesive may be baked in an oven before the next layer is applied. However, in a preferred embodiment, this baking is not done. Not having this baking step increases production speed and therefore reduces production costs.

After applying the adhesive (and after the optional baking step if conducted), a fluoropolymer layer is applied by techniques known in the art. The layer may be applied by spraying the materials forming the layer onto the adhesive layer.

In embodiments, at least one additional fluoropolymer layer is applied. In a preferred embodiment at least two additional fluoropolymer layers are applied. In particular, both a mid-coat and a top-coat are preferably applied. Mid and top-coats that may be used are described in U.S. Pat. No. 5,998,034 to Marvil et al., which is herein incorporated by reference in it entirety. Each of the fluoropolymer layers may or may not be dried before the next fluoropolymer layer is applied.

After spraying the various layers, the liquid-coated roll may be cured using an infrared oven. The upper limit of the cure temperature may be determined by the temperature at which the silicone layer and/or the aminosilane adhesive layer begin to break down.

After completion of the cure, the roll may be polished using a superfinishing process, then inspected and packaged. The superfinishing process is well known to those skilled in the art.

EXAMPLES

The following examples illustrate specific embodiments of the present invention. One skilled in the art would recognize that the appropriate reagents, component ratio/concentrations may be adjusted as necessary to achieve specific product characteristics. All parts and percentages are by weight unless otherwise indicated.

Example 1

The fuser roll is constructed with a metal insert or substrate, preferably aluminum, but possibly including steel. To form the silicone layer, Toray DY35-6072 silicone (from DowCorning) is applied to the substrate via molding, post-cured, ground, and cleaned. The silicone layer is adhered to the substrate or base of the fuser roll using an adhesive, currently DowCorning P5200. The resulting silicone layer has a thickness of about 0.05-7 mm, preferably about 0.22 mm.

To adhere the fluoropolymer layer to the silicone layer, an aminosilane adhesive is applied to the surface of the silicone layer. The aminosilane adhesive used is A0700 (from United Chemical Technologies), which has the chemical name N-(2-aminoethyl)-3-aminopropyltrimethoxysilane. The aminosilane adhesive is diluted in dry alcohol at a level of 5% aminosilane 95% methanol by weight and sprayed at an approximate weight of 4 grams of solution per roll to form a layer having a thickness of 1-2 µm. In this example, the solution was dried in a 180° F. oven for 20 minutes. However, in a preferred embodiment, the solution is not dried in an oven. In particular, it was found that the next layer could be formed on the aminosilane adhesive before the adhesive was completely dried. Thus, it was found that it was not necessary to dry the adhesive in an oven before applying the next layer.

A first fluoropolymer layer is then applied to the surface of the aminosilane adhesive layer. This first fluoropolymer layer is formed from DuPont 855-021 (from E.I. DuPont de Nemours & Co.), which contains polytetrafluoroethylene, fluorinated ethylene propylene resin and polyamide-imide polymer in solvent. This base-coat layer is applied by spray-coating at a thickness of approximately 3-4 µm.

A second fluoropolymer layer is then applied on the first fluoropolymer layer. This second fluoropolymer layer is formed from DuPont 855-401 (from E.I. DuPont de Nemours & Co.), which contains polytetrafluoroethylene and acrylic resin in solvent. This mid-coat layer is applied by spray coating at an approximate thickness of 7 µm.

A third fluoropolymer layer is then applied on the second fluoropolymer layer. This third fluoropolymer layer is formed from DuPont 855-500 (from E.I. DuPont de Nemours & Co.), which contains polytetrafluoroethylene and acrylic resin in solvent. This top-coat layer is applied by spray coating at an approximate thickness of 10 µm.

The resulting structure is then cured by heating in a convection oven or infrared oven to approximately 700 F. A tape pull test is then conducted. On a clean, dry roll, a 2 inch section of Scotch™ 897 tape is placed and rubbed with pressure to achieve intimate contact. The area along the edges of the tape is scored with a razor blade. After 1 minute, the tape is removed. By this test, the structure is rated a 1 (best) on a scale of 1-5, 1 being no cohesive failure, 5 being complete failure of adhesion.

Comparative Example 1

The fuser roll of Example 1 was compared to a Xerox Nuvera fuser roll that is on the market. This fuser roll is within the teachings of U.S. Pat. No. 5,998,034 to Marvil et al. It contains a fluoropolymer topcoat on a compliant silicone rubber baselayer bonded to a metallic insert. The fluoropolymer topcoat is bonded to the compliant silicone rubber baselayer using a primer of a blend of silane and a polyamide resin. The silane is Chemlok 5151 and the polyamide is Micromid 632HDL or Versamid 100. The amount of silane in the primer blend is approximately 100 parts out of 108 parts by weight.

Whereas the structure in Example 1 rated a 1 in the tape pull test, the structure of Comparative Example 1 rated only a 3-4 in this test. In addition, whereas the adhesive layer of this product has a thickness of 6 µm, the adhesive layer of Example 1 has a thickness of 3-4 µm.

Example 2

The fuser roll is constructed with a metal insert or substrate, preferably aluminum, but possibly including steel. To form the silicone layer, Toray DY35-6072 silicone (from Dow Corning) is applied to the substrate via molding, post-cured, ground, and cleaned. The silicone layer is adhered to the substrate or base of the fuser roll using an adhesive, currently Dow Corning P5200. The resulting silicone layer has a thickness of about 0.05-7 mm, preferably about 0.22 mm.

The fuser roll with silicone layer is preheated in a convection or infrared oven to achieve a surface temperature of 180 F. Subsequent layers of aminosilane adhesive and base, mid and top-coats are sprayed in succession without drying.

The aminosilane adhesive is applied to the surface of the silicone layer. As in Example 1, the aminosilane adhesive used is A0700 (from United Chemical Technologies). The aminosilane adhesive is diluted in dry alcohol at a level of 5% aminosilane 95% methanol by weight and sprayed with approximately 4 g of solution per roll to form a layer having a thickness of 1-2 µm. Unlike in Example 1, this layer is not dried before applying the next layer.

A first fluoropolymer layer is then applied to the surface of the aminosilane adhesive layer. As in Example 1, this first fluoropolymer layer is formed from DuPont 855-021 (from E.I. DuPont de Nemours & Co.). This base-coat layer is applied by spray-coating at a thickness of approximately 3-4 µm.

A second fluoropolymer layer is then applied on the first fluoropolymer layer. As in Example 1, this second fluoropolymer layer is formed from DuPont 855-401 (from E.I. DuPont de Nemours & Co.). This mid-coat layer is applied by spray coating at an approximate thickness of 7 µm.

A third fluoropolymer layer is then applied on the second fluoropolymer layer. As in Example 1, this third fluoropolymer layer is formed from DuPont 855-500 (from E.I. DuPont de Nemours & Co.). This top-coat layer is applied by spray coating at an approximate thickness of 10 µm.

The resulting structure is then cured by heating in a convection oven or infrared oven. A tape pull test is then conducted. On a clean, dry roll, a 2 inch section of Scotch™ 897 tape is placed and rubbed with pressure to achieve intimate contact. The area along the edges of the tape is scored with a razor blade. After 1 minute, the tape is removed. By this test, the structure is rated a 1 (best) on a scale of 1-5, 1 being no cohesive failure, 5 being complete failure of adhesion.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A layered structure, comprising:
    a first layer containing silicone;
    a second layer containing a fluoropolymer; and
    between the first and second layers, an adhesive layer comprising an aminosilane adhesive, a fluoropolymer and at least one of a polyamide-imide or a polyamide.

2. A layered structure according to claim 1, wherein said adhesive layer contains at least 70% by weight aminosilane compounds.

3. A roller comprising the layered structure of claim 1.

4. The roller according to claim 3, wherein the first layer is an internal layer of the roller and the second layer is over the first layer.

5. The roller according to claim 4, wherein the second layer is a surface layer.

6. A xerographic device comprising a fuser member comprising a layered structure according to claim 1.

7. The xerographic device according to claim 6, wherein the first layer is an internal layer of the fuser member and the second layer is over the first layer.

8. The xerographic device according to claim 6, wherein said fuser member is a roller or a belt.

9. A method for adhering a silicone-containing layer to a fluoropolymer-containing layer to form a layered structure according to claim 1, comprising:
    applying an adhesive layer to a silicone-containing layer, said adhesive layer comprising an aminosilane adhesive, a fluoropolymer and at least one of a polyamide-imide or a polyamide; and
    forming the fluoropolymer-containing layer over said adhesive layer.

10. The method according to claim 9, wherein said fluoropolymer-containing layer is formed over said adhesive layer before the adhesive layer has completely dried.

11. The method according to claim 9, wherein said adhesive layer contains at least 50% by weight aminosilane compounds.

12. A layered structure according to claim 1, wherein said adhesive layer contains at least 50% by weight aminosilane compounds.

* * * * *